UNITED STATES PATENT OFFICE.

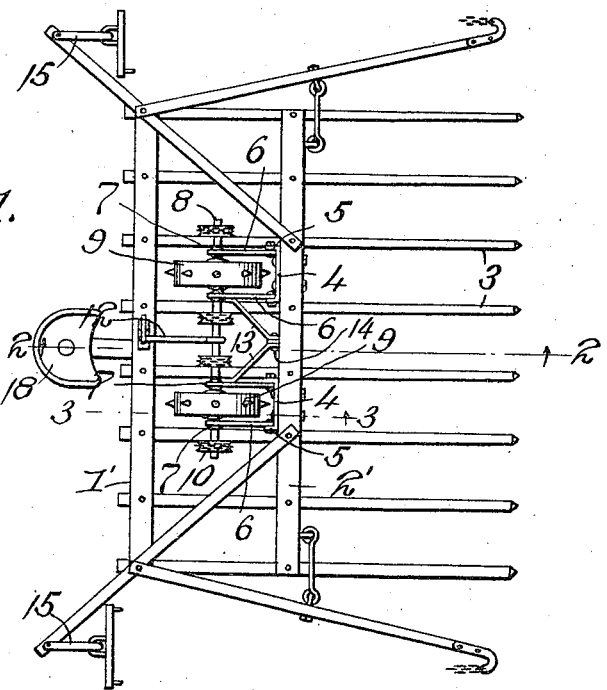
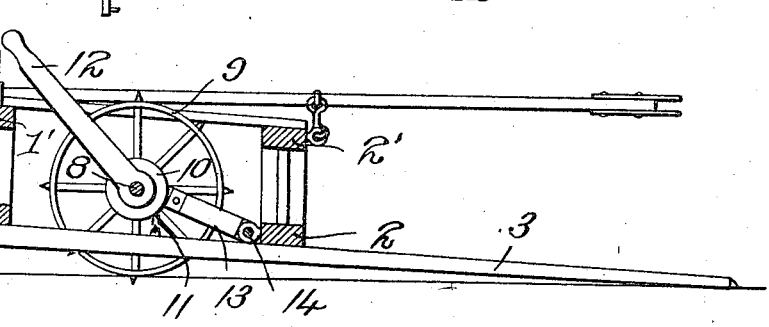
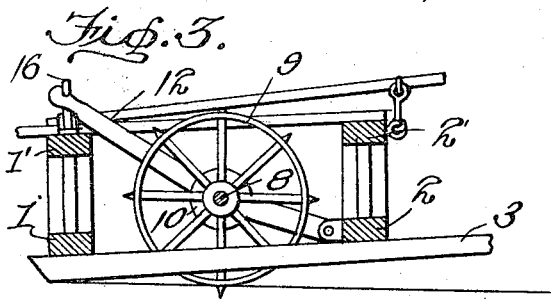
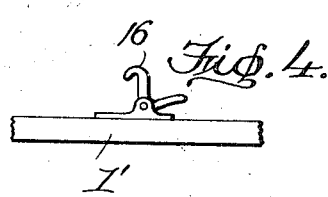

PETER B. JOHNSON, OF NORFOLK, NEBRASKA.

HAY-RAKE.

1,263,321.   Specification of Letters Patent.   Patented Apr. 16, 1918.

Application filed September 18, 1916. Serial No. 120,770.

*To all whom it may concern:*

Be it known that I, PETER B. JOHNSON, a citizen of the United States, residing at Norfolk, in the county of Madison, State of Nebraska, have invented certain new and useful Improvements in Hay-Rakes; and I do hereby declare the following to be a full, clear, and exact description of the invention, such as will enable others skilled in the art to which it appertains to make and use the same.

The present invention is directed to improvements in hay rakes, and more particularly to that type which are propelled by draft animals.

The invention has for its object to provide a device of this character constructed in such a manner that the rake can be conveniently raised and lowered at its rear end so as to facilitate the gathering and discharging of the hay.

A further object of the invention is to provide a hay rake provided with an axle which supports the ground wheels, and also serves as means for raising and lowering the rake.

With these and other objects in view, this invention resides in the novel features of construction, formation, combination and arrangement of parts to be hereinafter more fully described, claimed and illustrated in the accompanying drawing, in which:—

Figure 1 is a plan view of the device.

Fig. 2 is a sectional view on line 2—2 of Fig. 1.

Fig. 3 is a sectional view on line 3—3 of Fig. 1.

Fig. 4 is a detail view of the latch member carried by one of the sills.

Referring to the drawing 1 and 2 designate transverse sills which support the rake teeth 3 of the conventional form.

Secured to the sill 2 are brackets 4 having ears 5 formed upon their ends to which are pivotally connected the forward ends of the bars 6 which have their rear ends provided with bearings 7 rotatably supporting the axle 8, said axle having loosely engaged thereon ground wheels 9.

Fixed to the axle 8 are grooved pulleys 10 having secured thereto one end of the chains 11, the other ends of said chains being fixed to the adjacent teeth 3.

A lever 12 is provided and has its lower end fixed to the axle 8, and serves to rotate the axle 8 to wind or unwind the chains 11 on the pulleys 10 so as to elevate or lower the teeth.

Brace bars 13 have their forward ends pivotally connected to the eye bolt 14 which is carried by the sill 2, said bars having their rear ends connected to the adjacent bars 6.

The draft animals are hitched to the draft devices 15 which are supported by the sills 1' and 2', and any well known means may be employed for holding the lever 12 in adjusted position.

Supported above the sills 1 and 2 are sills 1' and 2', and pivotally mounted on the sill 1' is a latch 16 serving to engage the lever 12 so as to hold the teeth 3 in a position as shown in Fig. 3 of the drawing. The bar 17 is supported by the sill 1' and has connected thereto a driver's seat 18.

What is claimed is:—

A hay rake of the class described comprising a frame including upper and lower pairs of sills, rake teeth secured to the lower sills, brackets carried by one of said lower sills, bars having their forward ends pivoted to said brackets and having bearings carried by their rear ends, an axle in said bearings, ground wheels rotatably mounted on said axle, pulleys carried by said axle, chains engaging said pulleys and connected to certain of said teeth forwardly of said axle, a lever for rotating said pulleys to wind or unwind the chains thereon to tilt said frame and thus raise or lower the forward ends of said rake teeth, and a catch carried by one of said upper sills for engaging said lever to retain the same in an adjusted position.

In testimony whereof, I affix my signature in the presence of two witnesses.

PETER B. JOHNSON.

Witnesses:
  H. A. DAHL,
  M. HAVENS.

Copies of this patent may be obtained for five cents each, by addressing the "Commissioner of Patents, Washington, D. C."